United States Patent
Terry

(10) Patent No.: US 10,616,025 B2
(45) Date of Patent: *Apr. 7, 2020

(54) SYSTEM AND METHOD FOR CONTROLLING COMBINED RADIO SIGNALS

(71) Applicant: PlusN, LLC, Elmsford, NY (US)

(72) Inventor: John David Terry, Annandale, VA (US)

(73) Assignee: PlusN, LLC, Elmsford, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/256,708

(22) Filed: Jan. 24, 2019

(65) Prior Publication Data

US 2019/0173708 A1 Jun. 6, 2019

Related U.S. Application Data

(63) Continuation of application No. 15/581,930, filed on Apr. 28, 2017, now Pat. No. 10,193,729, which is a
(Continued)

(51) Int. Cl.
*H04L 27/26* (2006.01)
*H04L 5/00* (2006.01)

(52) U.S. Cl.
CPC ........ *H04L 27/2615* (2013.01); *H04L 5/0007* (2013.01); *H04L 27/265* (2013.01);
(Continued)

(58) Field of Classification Search
CPC ............. H04L 27/2614; H04L 27/2615; H04L 27/2623; H04L 27/2624; H04L 27/2621
See application file for complete search history.

(56) References Cited

U.S. PATENT DOCUMENTS

| | | | | |
|---|---|---|---|---|
| 5,302,914 A | * | 4/1994 | Arntz | ........................ H03F 1/34 330/124 R |
| 8,111,778 B2 | * | 2/2012 | Yano | .................... H04L 27/2614 375/260 |

(Continued)

OTHER PUBLICATIONS

Kang et al. "A Novel Subblock Partition Scheme for Partial Transmit Sequence OFDM", Sep. 1999, pp. 333-338.*

*Primary Examiner* — Sophia Vlahos
(74) *Attorney, Agent, or Firm* — Tully Rinckey PLLC; Steven M. Hoffberg

(57) ABSTRACT

A method for controlling a combined waveform, representing a combination of at least two signals having orthogonal frequency multiplexed signal components, comprising: receiving information defining the at least two signals; transforming the information defining each signal to a representation having orthogonal frequency multiplexed signal components, such that at least one signal has at least two alternate representations of the same information, and combining the transformed information using the at least two alternate representations, in at least two different ways, to define respectively different combinations; analyzing the respectively different combinations with respect to at least one criterion; and outputting a respective combined waveform or information defining the waveform, representing a selected combination of the transformed information from each of the at least two signals selected based on the analysis.

20 Claims, 9 Drawing Sheets

Related U.S. Application Data continuation of application No. 14/879,557, filed on Oct. 9, 2015, now Pat. No. 9,641,372, which is a continuation of application No. 14/071,697, filed on Nov. 5, 2013, now Pat. No. 9,160,593, which is a continuation of application No. 12/824,608, filed on Jun. 28, 2010, now Pat. No. 8,582,687.

(60) Provisional application No. 61/220,802, filed on Jun. 26, 2009, provisional application No. 61/221,190, filed on Jun. 29, 2009.

(52) U.S. Cl.
CPC ...... H04L 27/2614 (2013.01); H04L 27/2626 (2013.01); *H04L 27/2621* (2013.01)

(56) References Cited

U.S. PATENT DOCUMENTS

| | | | | |
|---|---|---|---|---|
| 9,641,372 | B2* | 5/2017 | Terry | H04L 27/2615 |
| 2005/0113101 | A1* | 5/2005 | Hansen | H04B 1/10 |
| | | | | 455/450 |
| 2005/0265226 | A1* | 12/2005 | Shen | H04L 27/2614 |
| | | | | 370/210 |
| 2009/0147870 | A1* | 6/2009 | Lin | H04L 27/2614 |
| | | | | 375/260 |

\* cited by examiner

SYSTEM AND METHOD FOR CONTROLLING COMBINED RADIO SIGNALS

CROSS REFERENCE TO RELATED APPLICATIONS

This Application is a:

Continuation of U.S. patent application Ser. No. 15/581,930, filed Apr. 28, 2017, now U.S. Pat. No. 10,193,729, issued Jan. 29, 2019, which is a Continuation of U.S. patent application Ser. No. 14/879,557, filed Oct. 9, 2015, now U.S. Pat. No. 9,641,372, issued May 2, 2017, which is a Continuation of U.S. patent application Ser. No. 14/071,697, filed Nov. 5, 2013, now U.S. Pat. No. 9,160,593, issued Oct. 13, 2015, which is a Continuation of U.S. patent application Ser. No. 12/824,608, filed Jun. 28, 2010, now U.S. Pat. No. 8,582,687, issued Nov. 12, 2013, which is a Non-provisional application claiming benefit of priority under 35 U.S.C. § 119(e) from U.S. Provisional Application No. 61/221,190 filed Jun. 29, 2009, and which is a Non-provisional application claiming benefit of priority under 35 U.S.C. § 119(e) from U.S. Provisional Application No. 61/220,802 filed Jun. 26, 2009, the entirety of which are each expressly incorporated herein by reference.

FIELD OF THE INVENTION

This invention relates to the field of wireless communications of radio-frequency signals. More specifically, it relates to controlling a combined signal, for example to reduce its peak to average power ratio or an inferred error at a receiver.

BACKGROUND OF THE INVENTION

A common signal format for mobile wireless communications is orthogonal frequency-domain multiplexing, or OFDM, and closely related formats such as orthogonal frequency-domain multiple access (OFDMA). For a signal conveyed on an OFDM channel, this is characterized in the frequency domain by a bundle of narrow adjacent subchannels, and in the time domain by a relatively slow series of OFDM symbols each with a time T, each separated by a guard interval $\Delta T$ (see FIG. 1). Within the guard interval before each symbol is a cyclic prefix (CP), comprised of the same signal in the symbol period, cyclically shifted in time. This CP is designed to reduce the sensitivity of the received signal to precise time synchronization in the presence of multipath, i.e., radio-frequency signals reflecting from large objects in the terrain such as tall buildings, hills, etc. If a given symbol is received with a slight time delay (less than $\Delta T$), it will still be received without error. In addition to the data symbols associated with the OFDM "payload", there is also typically a "preamble" signal that establishes timing and other standards. The preamble may have its own CP, not shown in FIG. 1.

In OFDM, the sub-carrier frequencies are chosen so that the sub-carriers are orthogonal to each other, meaning that cross-talk between the sub-channels is eliminated and inter-sub-carrier guard bands are not required. This greatly simplifies the design of both the transmitter and the receiver; unlike conventional FDM, a separate filter for each sub-channel is not required. The orthogonality requires that the sub-carrier spacing is $\Delta f = k/(T_U)$ Hertz, where $T_U$ seconds is the useful symbol duration (the receiver side window size), and k is a positive integer, typically equal to 1. Therefore, with N sub-carriers, the total passband bandwidth will be $B \approx N \cdot \Delta f$ (Hz). The orthogonality also allows high spectral efficiency, with a total symbol rate near the Nyquist rate. Almost the whole available frequency band can be utilized. OFDM generally has a nearly "white" spectrum, giving it benign electromagnetic interference properties with respect to other co-channel users.

When two OFDM signals are combined, the result is in general a non-orthogonal signal. While a receiver limited to the band of a single OFDM signal would be generally unaffected by the out-of-channel signals, when such signals pass through a common power amplifier, there is an interaction, due to the inherent non-linearities of the analog system components.

OFDM requires very accurate frequency synchronization between the receiver and the transmitter; with frequency deviation the sub-carriers will no longer be orthogonal, causing intercarrier interference (ICI), i.e. cross-talk between the sub-carriers. Frequency offsets are typically caused by mismatched transmitter and receiver oscillators, or by Doppler shift due to movement. While Doppler shift alone may be compensated for by the receiver, the situation is worsened when combined with multipath, as reflections will appear at various frequency offsets, which is much harder to correct.

The orthogonality allows for efficient modulator and demodulator implementation using the fast Fourier transform (FFT) algorithm on the receiver side, and inverse FFT (IFFT) on the sender side. While the FFT algorithm is relatively efficient, it has modest computational complexity which may be a limiting factor.

One key principle of OFDM is that since low symbol rate modulation schemes (i.e. where the symbols are relatively long compared to the channel time characteristics) suffer less from intersymbol interference caused by multipath propagation, it is advantageous to transmit a number of low-rate streams in parallel instead of a single high-rate stream. Since the duration of each symbol is long, it is feasible to insert a guard interval between the OFDM symbols, thus eliminating the intersymbol interference. The guard interval also eliminates the need for a pulse-shaping filter, and it reduces the sensitivity to time synchronization problems.

The cyclic prefix, which is transmitted during the guard interval, consists of the end of the OFDM symbol copied into the guard interval, and the guard interval is transmitted followed by the OFDM symbol. The reason that the guard interval consists of a copy of the end of the OFDM symbol is so that the receiver will integrate over an integer number of sinusoid cycles for each of the multipaths when it performs OFDM demodulation with the FFT.

The effects of frequency-selective channel conditions, for example fading caused by multipath propagation, can be considered as constant (flat) over an OFDM sub-channel if the sub-channel is sufficiently narrow-banded, i.e. if the number of sub-channels is sufficiently large. This makes equalization far simpler at the receiver in OFDM in comparison to conventional single-carrier modulation. The equalizer only has to multiply each detected sub-carrier (each Fourier coefficient) by a constant complex number, or a rarely changed value. Therefore, receivers are generally tolerant of such modifications of the signal, without requiring that explicit information be transmitted.

OFDM is invariably used in conjunction with channel coding (forward error correction), and almost always uses frequency and/or time interleaving. Frequency (subcarrier) interleaving increases resistance to frequency-selective channel conditions such as fading. For example, when a part of the channel bandwidth is faded, frequency interleaving ensures that the bit errors that would result from those subcarriers in the faded part of the bandwidth are spread out in the bit-stream rather than being concentrated. Similarly, time interleaving ensures that bits that are originally close together in the bit-stream are transmitted far apart in time, thus mitigating against severe fading as would happen when travelling at high speed. Therefore, similarly to equalization per se, a receiver is typically tolerant to some degree of modifications of this type, without increasing the resulting error rate.

The OFDM signal is generated from the digital baseband data by an inverse (fast) Fourier transform (IFFT), which is computationally complex, and as will be discussed below, generates a resulting signal having a relatively high peak to average power ratio (PAPR) for a set including a full range of symbols. This high PAPR, in turn generally leads to increased acquisition costs and operating costs for the power amplifier (PA), and typically a larger non-linear distortion as compared to systems designed for signals having a lower PAPR. This non-linearity leads, among other things, to clipping distortion and intermodulation (IM) distortion, which have the effect of dissipating power, causing out of band interference, and possibly causing in-band interference with a corresponding increase in bit error rate (BER) at a receiver.

In a traditional type OFDM transmitter, a signal generator performs error correction encoding, interleaving, and symbol mapping on an input information bit sequence to produce transmission symbols. The transmission symbols are subjected to serial-to-parallel conversion at the serial-to-parallel (S/P) converter and converted into multiple parallel signal sequences. The S/P converted signal is subjected to inverse fast Fourier transform at IFFF unit. The signal is further subjected to parallel-to-serial conversion at the parallel-to-serial (P/S) convert converter, and converted into a signal sequence. Then, guard intervals are added by the guard interval (GI) adding unit. The formatted signal is then up-converted to a radio frequency, amplified at the power amplifier, and finally transmitted as an OFDM signal by a radio antenna.

On the other hand, in a traditional type the OFDM receiver, the radio frequency signal is down-converted to baseband or an intermediate frequency, and the guard interval is removed from the received signal at the guard interval removing unit. Then, the received signal is subjected to serial-to-parallel conversion at S/P converter, fast Fourier transform at the fast Fourier transform (FFT) unit, and parallel-to-serial conversion at P/S converter. Then, the decoded bit sequence is output.

It is conventional for each OFDM channel to have its own transmit chain, ending in a power amplifier (PA) and an antenna element. However, in some cases, one may wish to transmit two or more separate OFDM channels using the same PA and antenna, as shown in FIG. 2. This may permit a system with additional communications bandwidth on a limited number of base-station towers. Given the drive for both additional users and additional data rate, this is highly desirable. The two channels may be combined at an intermediate frequency using a two-stage up-conversion process as shown in FIG. 2. Although amplification of real baseband signals is shown in FIG. 2, in general one has complex two-phase signals with in-phase and quadrature up-conversion (not shown). FIG. 2 also does not show the boundary between digital and analog signals. The baseband signals are normally digital, while the RF transmit signal is normally analog, with digital-to-analog conversion somewhere between these stages.

Consider two similar channels, each with average power $P_0$ and maximum instantaneous power $P_1$. This corresponds to a peak-to-average power ratio $PAPR=P_1/P_0$, usually expressed in dB as $PAPR[dB]=10 \log(P_1/P_0)$. For the combined signal, the average power is $2 P_0$ (an increase of 3 dB), but the maximum instantaneous power can be as high as 4 $P_1$, an increase of 6 dB. Thus, PAPR for the combined signal can increase by as much as 3 dB. This maximum power will occur if the signals from the two channels happen to have peaks which are in phase. This may be a rare transient occurrence, but in general the linear dynamic range of all transmit components must be designed for this possibility. Nonlinearities will create intermodulation products, which will degrade the signal and cause it to spread into undesirable regions of the spectrum. This, in turn, may require filtering, and in any case will likely reduce the power efficiency of the system.

Components with required increases in linear dynamic range to handle this higher PAPR include digital-to-analog converters, for example, which must have a larger number of effective bits to handle a larger dynamic range. But even more important is the power amplifier (PA), since the PA is generally the largest and most power-intensive component in the transmitter. While it is sometimes possible to maintain components with extra dynamic range that is used only a small fraction of the time, this is wasteful and inefficient, and to be avoided where possible. An amplifier with a larger dynamic range typically costs more than one with a lower dynamic range, and often has a higher quiescent current drain and lower efficiency for comparable inputs and outputs.

This problem of the peak-to-average power ratio (PAPR) is a well-known general problem in OFDM and related waveforms, since they are constructed of multiple closely-spaced subchannels. There are a number of classic strategies to reducing the PAPR, which are addressed in such review articles as "Directions and Recent Advances in PAPR Reduction Methods", Hanna Bogucka, Proc. 2006 IEEE International Symposium on Signal Processing and Information Technology, pp. 821-827, incorporated herein by reference. These PAPR reduction strategies include amplitude clipping and filtering, coding, tone reservation, tone injection, active constellation extension, and multiple signal representation techniques such as partial transmit sequence (PTS), selective mapping (SLM), and interleaving. These techniques can achieve significant PAPR reduction, but at the expense of transmit signal power increase, bit error rate (BER) increase, data rate loss, increase in computational complexity, and so on. Further, many of these techniques require the transmission of additional side-information (about the signal transformation) together with the signal itself, in order that the received signal be properly decoded. Such side-information reduces the generality of the technique, particularly for a technology where one would like simple mobile receivers to receive signals from a variety of base-station transmitters. To the extent compatible, the techniques disclosed in Bogucka, and otherwise known in the art, can be used in conjunction with the techniques discussed herein-below.

Various efforts to solve the PAPR (Peak to Average Power Ratio) issue in an OFDM transmission scheme, include a frequency domain interleaving method, a clipping filtering method (See, for example, X. Li and L. J. Cimini, "Effects of Clipping and Filtering on the Performance of OFDM", IEEE Commun. Lett., Vol. 2, No. 5, pp. 131-133, May, 1998), a partial transmit sequence (PTS) method (See, for example, L. J Cimini and N. R. Sollenberger, "Peak-to-Average Power Ratio Reduction of an OFDM Signal Using Partial Transmit Sequences", IEEE Commun. Lett., Vol. 4, No. 3, pp. 86-88, March, 2000), and a cyclic shift sequence (CSS) method (See, for example, G. Hill and M. Faulkner, "Cyclic Shifting and Time Inversion of Partial Transmit Sequences to Reduce the Peak-to-Average Ratio in OFDM", PIMRC 2000, Vol. 2, pp. 1256-1259, September 2000). In addition, to improve the receiving characteristic in OFDM transmission when a non-linear transmission amplifier is used, a PTS method using a minimum clipping power loss scheme (MCPLS) is proposed to minimize the power loss clipped by a transmission amplifier (See, for example, Xia Lei, Youxi Tang, Shaoqian Li, "A Minimum Clipping Power Loss Scheme for Mitigating the Clipping Noise in OFDM", GLOBECOM 2003, IEEE, Vol. 1, pp. 6-9, December 2003). The MCPLS is also applicable to a cyclic shifting sequence (CSS) method.

In a partial transmit sequence (PTS) scheme, an appropriate set of phase rotation values determined for the respective subcarriers in advance is selected from multiple sets, and the selected set of phase rotations is used to rotate the phase of each of the subcarriers before signal modulation in order to reduce the peak to average power ratio (See, for example, S. H. Muller and J. B. Huber, "A Novel Peak Power Reduction Scheme for OFDM", Proc. of PIMRC '97, pp. 1090-1094, 1997; and G. R. Hill, Faulkner, and J. Singh, "Deducing the Peak-to-Average Power Ratio in OFDM by Cyclically Shifting Partial Transmit Sequences", Electronics Letters, Vol. 36, No. 6, 16 March, 2000).

What is needed is a practical method and associated apparatus for reducing the PAPR of combined OFDM signals, in a way that does not degrade the received signal or require the transmission of side-information.

The following patents, each of which are expressly incorporated herein by reference, relate to peak power ratio considerations: U.S. Pat. Nos. 7,535,950; 7,499,496; 7,496,028; 7,467,338; 7,463,698; 7,443,904; 7,376,202; 7,376,074; 7,349,817; 7,345,990; 7,342,978; 7,340,006; 7,321,629; 7,315,580; 7,292,639; 7,002,904; 6,925,128; 7,535,950; 7,499,496; 7,496,028; 7,467,338; 7,443,904; 7,376,074; 7,349,817; 7,345,990; 7,342,978; 7,340,006; 7,339,884; 7,321,629; 7,315,580; 7,301,891; 7,292,639; 7,002,904; 6,925,128; 5,302,914; 20100142475; 20100124294; 20100002800; 20090303868; 20090238064; 20090147870; 20090135949; 20090110034; 20090110033; 20090097579; 20090086848; 20090080500; 20090074093; 20090067318; 20090060073; 20090060070; 20090052577; 20090052561; 20090046702; 20090034407; 20090016464; 20090011722; 20090003308; 20080310383; 20080298490; 20080285673; 20080285432; 20080267312; 20080232235; 20080112496; 20080049602; 20080008084; 20070291860; 20070223365; 20070217329; 20070189334; 20070140367; 20070121483; 20070098094; 20070092017; 20070089015; 20070076588; 20070019537; 20060268672; 20060247898; 20060245346; 20060215732; 20060126748; 20060120269; 20060120268; 20060115010; 20060098747; 20060078066; 20050270968; 20050265468; 20050238110; 20050100108; 20050089116; and 20050089109.

See, also, each of which is expressly incorporated herein by reference:

ALHARBI, ET AL., "A combined SLM and closed-loop QO-STBC for PAPR mitigation in MIMO-OFDM transmission". www.eurasip.org/proceedings/Eusipco/Eusipco2008/papers/1569102063 2008.

AL-KEBSI, ET AL., "Throughput enhancement and performance improvement of the OFDM based WLAN system", IJCSNS International Journal of Computer Science and Network Security, vol. 9, no. 4, April 2009.

ANDGART, ET AL., "Designing Tone Reservation PAR reduction", EURASIP Journal on applied Signal Processing, vol 2006, article ID 38237, pages 1-14.

BAXLEY, "Analyzing selected mapping for peak-to-average power reduction in OFDM", Thesis, School of Electrical and Computer Engineering, Georgia Institute of Technology, May 2005.

BAXLEY, ET AL., "Assessing peak-to-average power ratios for communications applications", Proc. IEEE Military Communications Conf (MILCOM 2004).

BAXLEY, ET AL., "Ordered phase sequence testing in SLM for improved blind detection", Proc. 2005 IEEE Conf on Signal Processing Advances in Wireless Communication.

BEHRAVAN, ET AL., "Iterative estimation and cancellation of nonlinear distortion in OFDM systems", www.mantracom.com/downloads Jun. 19, 2008.

BOCCARDI, ET AL., "The p-sphere encoder: vector precoding with low peak-power for the MIMO Gaussian Broadcast Channel", IEEE Trans. Comm., vol. 54, p. 1703, September 2006.

BONACCORSO, ET AL., "Reducing the peak to average power ratio in OFDM systems", Dix-septieme colloque GRETSI, Vannes, 13-17 September, 1999.

BOONSRIMUANG, ET AL., "Mitigation of non-linear distortion using PTS and IDAR method for multi-level QAM-OFDM system", ECTI Transactions on Computer and Information Technology, vol. 1, no. 2, November 2005.

BREILING, ET AL., "Distortionless reduction of peak power without explicit side information", 2000 IEEE Global Telecommunications Conference.

BREILING, ET AL., "SLM peak-power reduction without explicit side information", IEEE Communications Letters, vol. 5, no. 6, June 2001.

CHEN, ET AL., "A modified selective mapping with PAPR reduction and error correction in OFDM systems", 2007 IEEE Wireless Com. and Networking Conf., pp. 1329-1333.

CHOI, ET AL., "Peak power reduction scheme based on subcarrier scrambling for MC-CDMA systems", IEE Proceedings on Communications, vol. 151, pp. 39-43, February 2004.

CIOCHINA, ET AL., "An analysis of OFDM peak power reduction techniques for WiMAX systems', Proc. 2006 Int. Conf on Communications, pp. 4676-4681.

DAOUD, O., et al., "PAPR Reduction by Linear Coding Techniques for MIMO-OFDM Systems Performance Improvement: Simulation and Hardware Implementation", European Journal of Scientific Research, Vol. 36 No. 3 (2009), pp 376-393.

DE FIGUEIREDO, "Adaptive pre-distorters for linearization of high power amplifiers in OFDM wireless communications", IEEE North Jersey Section CASS/EDS Chapter, Distinguished lecture.

DENG, ET AL., "OFDM PAPR reduction using clipping with distortion control", Proc. 2005 IEEE Conf. on Communications.

DEUMAL, ET AL., "Peak reduction of multi-carrier systems by controlled spectral outgrowth", Proc. IEEE Intl. Conf. on Acoustics, Speech and Signal Processing (ICASSP), 2006.

DEVLIN, ET AL., "Gaussian pulse based tone reservation for reducing PAPR of OFDM signals", 2007 IEEE Vehicular Technol. Conf.

FISCHER, "Peak-to-average power ratio (PAR) reduction in OFDM based on lattice decoding", Proc. Int. OFDM Workshop.

FISCHER, "Widely-linear selected mapping for peak-to-average power ratio reduction in OFDM", Electronics Letters, vol. 43, 2007.

FISCHER, ET AL., "Directed selected mapping for peak-to-average power ratio reduction in MIMO OFDM", Proc. International OFDM Workshop, 2007.

FISCHER, ET AL., "Peak-to-average power ratio reduction in MIMO OFDM", Proc. 2007 Int. Conf on Communications, pp. 762-767.

FISCHER, ET AL., "Peak-to-average power ratio reduction in single- and multi-antenna OFDM via directed selected mapping", Jul. 19, 2007.

FISCHER, ET AL., "Signal shaping for peak-power and dynamics reduction in transmission schemes employing precoding", IEEE Trans. on Comm., v50, pp. 735-741, May 2002.

GIANNOPOULOS, ET AL., "Novel efficient weighting factors for PTS-based PAPR reduction in low-power OFDM transmitters", www.eurasip.org/proceedings/Eusipco/Eusipco2006/papers/1568982220 2006.

GIANNOPOULOS, ET AL., "Relationship among BER, power consumption and PAPR", 2008 IEEE Int. Symp on Wireless Pervasive Computing, pp. 633-637.

GUEL, ET AL., "Approximation of the average power variation for geometric adding signal approach of PAPR reduction in context of OFDM signals", Union Radio Scientifique Internationale-URSI, Aug. 7-16, 2008, Chicago, Ill.

HABENDORF, ET AL., "Nonlinear predistortion with reduced peak-to-average power ratio", Proc. International Symposium on Wireless Communications.

HAIDER, "Peak to average ratio reduction in wireless OFDM communication systems", Thesis, Blekinge Institute of Technology, January 2006.

HENKEL, ET AL., "Another application for trellis shaping: PAR reduction for DMT (OFDM), IEEE Transactions on Communications, vol. 48, no. 9, September 2000.

HENKEL, ET AL., "Partial transmit sequences and trellis shaping", Proc. 5th Int. ITC Conf. on Source and Channel Coding, 2004.

HERRAIZ, "Multicarrier communication systems with low sensitivity to nonlinear amplification", Thesis, Eng. i Arquitectura La Salle, Univers. Ramon Llull, Barcelona 2008.

HOSSEINI, ET AL., "PAPR reduction in OFDM systems using polynomial-based compressing and iterative expanding", 2006 IEEE ICASSP.

HUSSAIN, ET AL., "Peak to average power ratio reduction for multi-band OFDM system using tone reservation", www.ursi-test.intec.ugent.be/files/URSIGA08/papers/CPS2p5 2008.

HUSSAIN, ET AL., "Tone reservation's complexity reduction using fast calculation of maximal IDFT element", IEEE, IWCMC 08, Greece (2008).

HUSSEIN, ET AL., "Performance enhancement of STBC OFDM-CDMA system using channel coding techniques over multipath fading channel", Journal of Theoretical and Applied Information Technology, Vol. 5, No. 5, pp. 591-601, June, 2009.

INDERJEET KAUR, et al., "The Minimum PAPR Code for OFDM Systems", World Academy of Science, Engineering and Technology 46 2008 p. 285.

JAFARI, "Adaptive lattice reduction in MIMO systems", Thesis, University of Waterloo, Canada, 2008.

JAYALATH, ET AL., "On the PAR reduction of OFDM signals using multiple signal representation", IEEE Communications Letters, vol. 8, no. 7, July 2004.

JAYALATH, ET AL., "SLM and PTS peak-power reduction of OFDM signals without side information", IEEE Trans. on Wireless Communications, vol. 4, no. 5, September 2005.

JAYALATH, ET AL., "Use of data permutation to reduce the peak-to-average power ratio of an OFDM signal", Wireless Communications and Mobile Computing, 2002, 2:187-203.

JIANG, ET AL., "Two novel nonlinear companding schemes with iterative receiver to reduce PAPR in multicarrier modulation systems", IEEE Transaction on Broadcasting, vol. 52, pp. 268-273, June 2006.

JIMENEZ ET AL., "Study and Implementation of complementary Golay sequences for PAR reduction in OFDM signals", Proc. 11th Med. Electrotech. Conf. MELECON 2002, pp. 198-203.

KASIRI, ET AL., "A preprocessing method for PAPR reduction in OFDM systems by modifying FFT and IFFT matrices", The 18th Annual IEEE International Symposium on Personal, Indoor and Mobile Radio Communications (PIMRC'07).

Lee et al., "Novel low-complexity SLM schemes for PAPR reduction in OFDM systems", Proc. 2008 IEEE Global Telecommunications Conf GLOBECOM 2008.

LEE, ET AL., "Unitary peak power reduction for short packet communications in multiple transmit antennas", IEEE Trans. Commun., vol. 56, February 2008, pp. 234-244.

LIN, "Performance analysis in the PAPR of OFDM system via SLM scheme", Master Thesis, Institute of Communication Engineering, Tatung University, January 2004.

LIN, ET AL., "Selective-mapping type peak power reduction techniques for turbo coded OFDM", 2005 IEEE Conf. on Wireless Networks, Communications and Mobile Computing.

LOYKA, ET AL., "On the peak factor of sampled and continuous signals", Proc. 2006 IEEE Vehicular Technology Conf.

MALKIN, ET AL., "Dynamic allocation of reserved tones for PAR reduction", OFDM Workshop, August 2008, Hamburg Germany.

MALKIN, ET AL., "Optimal constellation distortion for PAR reduction in OFDM systems", Proc. 2008 PIMRC.

MARSALEK, "On the reduced complexity interleaving method for OFDM PAPR reduction", Radioengineering, vol. 1, no 3, September 2006.

MATEJKA, "DRM PAPR distribution and its relation to classical AM power amplifier", www.urel.feec.vutbr.cz/ra2008/archive/ra2003/papers/169.pdf, Radioelektronika 2003.

MOBASHER, ET AL., "Integer-based constellation shaping method for PAPR reduction in OFDM systems", IEEE Transactions on Communications, vol. 54, pp. 119-126, January 2006.

MULLER, ET AL., "OFDM with reduced peak-to-average power ratio by multiple signal representation", Annals of Telecommunications, vol. 52, no 1-2, pp. 58-67, February 1997.

NAWAZ, ET AL., "PAPR reduction technique for OFDM systems with rotated MPSK constellations and coordinate interleaving", Proc. 2008 IEEE Symp on Comm. & Veh. Technol.

PARK, ET AL., "Tone reservation method for PAPR reduction scheme", IEEE 802.16e-03/60.

PISE, ET AL., "Packet forwarding with multiprotocol label switching" World Academy of Science, Engineering and Technology 12 2005.

PRADABPET, ET AL., "A new PAPR reduction in OFDM systems using PTS combined with APPR for TWTA nonlinear HPA", Songklanakarin J. Sci. Technol. 30 (3), 355-360, May-June 2008.

PRADABPET, ET AL., "A new PTS method using GA for PAPR reduction in OFDM-WLAN 802.11a systems", www.jcsse.org/slide/comp_int/P0014.pdf.

RAGUSA, ET AL., "Invertible clipping for increasing the power efficiency of OFDM amplification", Proc. 2007 IEEE Int. Symposium on Personal Indoor and Mobile Radio Communications.

RAJBANSHI, "OFDM-based cognitive radio for DSA networks", Technical Report, The University of Kansas (2007).

RAJBANSHI, ET AL., "Adaptive-mode peak-to-average power ratio reduction algorithm for OFDM-based cognitive radio", 2006 IEEE Vehicular Technology Conf.

RAJBANSHI, ET AL., "OFDM symbol design for peak-to-average power ratio reduction employing non-data bearing subcarriers", Proc. 2008 IEEE Wireless Communications and Networking Conference, pp. 554-558.

RAJBANSHI, ET AL., "Peak-to-average power ratio analysis for NC-OFDM transmissions", Proc. 2007 IEEE Vehicular Technology Conference.

REN, "An improved selected mapping scheme for PAPR reduction in OFDM systems", Thesis, University of Cincinnati.

SAITO, ET AL., "PAPR reduction of MC-CDMA signals by selected mapping with interleavers", Multi-Carrier Spread-Spectrum, Springer Netherlands, pp. 453-460.

SARI, "OFDM peak power reduction techniques performance analysis for WiMAX Systems" Sequans Communications, 4th Annual Wireless Broadband Forum (2005).

SATHANANTHAN, ET AL., "Reducing intercarrier interference in OFDM systems by partial transmit sequence and selected mapping", Proc. Int'l. Symp. on DSP for Comm. Systems, 2002.

SCHENK, ET AL., "Peak-to-average power reduction in space division multiplexing based OFDM systems through spatial shifting", Electronics Letters, Jul. 21, 2005, vol. 41, no. 15.

SCHENK, ET AL., "The application of spatial shifting for peak-to-average power ratio reduction in MIMO OFDM systems", Proc. 2006 IEEE Vehicular Technol. Conf.

SCHURGERS, ET AL., "A systematic approach to peak-to-average power ratio in OFDM", Proc. SPIE vol 4474, p. 454 (2001).

SEZGINER, ET AL., "Metric-based symbol predistortion techniques for peak power reduction in OFDM systems", IEEE Trans. on Wireless Communications, vol. 6, no. 7, July 2007.

SHARIF, ET AL., "On the peak-to-average power of OFDM signals based on oversampling", IEEE Transactions on Communications, vol. 51, no. 1, January 2003.

SIEGL, ET AL., "Directed selected mapping for peak-to-average power ratio reduction in single-antenna OFDM", Proc. Int. OFDM Workshop.

SIEGL, ET AL., "Partial transmit sequences for Peak-to-average power ratio reduction in multiantenna OFDM", EURASIP Journal on Wireless Communications and Networking, vol. 2008, article ID 325829, 11 pages.

SIEGL, ET AL., "Peak-to-average power ratio reduction in multi-user OFDM", Proc. 2007 IEEE Int. Symp. on Information Theory.

SOHN, "RBF neural network based SLM peak-to-average power ratio reduction in OFDM systems, ETRI Journal, Volume 29, Number 3, June 2007.

TAHA, "Performance analysis of ICC technique for OFDM PAPR reduction and its application over BTC, Master's degree project, Stockholm, Sweden 2006.

TING-JUNG LIANG, et al., "Synchronization in OFDM-based WLAN with Transmit and Receive Diversities", in IEEE 16th Intl. Symp. on Personal, Indoor and Mobile Radio Comm., PIMRC 2005., vol. 2, 11-14 September 2005, pp. 740-744.

TSAI, ET AL., "A tail-biting turbo coded OFDM system for PAPR and BER reduction", 2007 IEEE Vehicular Technology Conference.

TSENG, ET AL., "A reduced-complexity PTS scheme for peak-to-average power ratio reduction in OFDM systems", Proc. European Society for Signal Processing (EURASIP) 2008.

VALBONESI, ET AL., "Low-complexity method for PAPR reduction in OFDM based on frame expansion parameter selection", 13$^{th}$ European Signal Processing Conference, Sep. 4-8, 2005, Antalya, Turkey.

VAN WELDEN, ET AL., "Clipping versus symbol switching for PAPR reduction in coded OFDM", 15$^{th}$ Annual Symposium of the IEEE/CVT Benelux Chapter, Nov. 13, 2008.

VEERAGANDHAM, "Orthogonal frequency division multiplexing" EECS 865: Wireless Communications.

VIJAYARANGAN, ET AL., "An overview of techniques for reducing peak to average power ratio and its selection criteria for orthogonal frequency division multiplexing radio systems", Journal of Theoretical and Applied Information Technology, vol 5, no. 5 (February 2009).

VIJAYARANGAN, ET AL., "Reducing peak to average power ratio in orthogonal frequency division multiplexing using modified peak factor mapping", IE(I) Journal-ET (February, 2008).

WANG, "PAPR reduction for OFDM", circa 2007.

WANG, "Peak to average power ratio reduction for OFDM", Research & Standards LGE Mobile Research, USA, Aug. 27, 2007, 3GPP2, TSG-C NTAH.

WANG, "Reduction of the PAPR in OFDM signals by applying PTS mechanism", Master Thesis, Institute of Communication Engineering, Tatung University, January 2004.

WEI, ET AL., "A modern extreme value theory approach to calculating the distribution of the peak-to-average power ratio in OFDM systems", 2002 IEEE Int. Conf. on Communications, vol. 3, pp. 1686-1690.

WEN, ET AL., "A sub-optimal PTS algorithm based on particle swarm optimization technique for PAPR reduction in OFDM systems", EURASIP J. Wireless Commun. and Networking (January 2008).

WEN, ET AL., "The PAPR reduction in OFDM system with the help of signal mapping scheme", International Journal of Applied Science and Engineering 2007, 5, 1: 75-80.

WESOLOWSKI, "On the PAPR minimization using selected mapping algorithm in pilot-assisted OFDM systems", Proc. European Wireless Conference, 2007.

WITS LAB.NSYSU "Peak-to-average power ratio (PAPR)", Wireless Inf. Trans. System Lab., Mar. 2, 2006, National Sun Yat-sen University, Institute of Communications Engineering.

WU, ET AL., "8B/10B Codec for efficient PAPR reduction in OFDM communication systems", IEEE Int'l Conf on Wireless Communications, Networking and Mobile Computing (WCNMC), Jun. 13-16, 2005, Maui, Hi., USA.

WU, ET AL., "Peak-to-average power ratio reduction in OFDM based on transformation of partial transmit sequences", Electronics Letters, Jan. 19, 2006, vol. 42, no. 2.

WULICH, ET AL., "Is PAPR reduction always justified for OFDM?", Proc. European Wireless Conference, 2007.

YANG, ET AL., "Selective vector perturbation precoding and peak to average power ratio reduction of OFDM systems", Proc. IEEE Global Telecommunications Conf., 2008.

ZHAO, "Distortion-based crest factor reduction algorithms in multi-carrier transmission systems", A Dissertation, Georgia Institute of Technology, December 2007.

ZHAO, ET AL., "A study on the PAPR reduction by hybrid algorithm based on the PTS and GS technique", The Journal of the Korean Institute of Communication Sciences, Vol. 31, No. 2A, p. 187, February 2006.

SUMMARY OF THE INVENTION

When multiple radio signals with different carrier frequencies are combined for transmission, this combined signal typically has an increased peak-to-average power ratio (PAPR), owing to the possibility of in-phase combining of peaks, requiring a larger radio-frequency power amplifier (PA) operating at low average efficiency. The PAPR for digital combinations of orthogonal frequency-domain multiplexed (OFDM) channels may be reduced by storing the time-domain OFDM signals for a given symbol period in a memory buffer, and carrying out cyclic time shifts of at least one OFDM signal, in order to select the time-shift corresponding to reduced PAPR of the combined multi-channel signal. This may be applied to signals either at baseband, or on upconverted signals. Simulations show that several decibels reduction in PAPR can be obtained without degrading system performance. No side information needs to be transmitted to the receiver.

A preferred embodiment of the present system and method seeks to control the PAPR by storing the time-domain OFDM signals for a given symbol period in a memory buffer, and carrying out cyclic time shifts of at least one of the OFDM signals, in order to select the time-shift corresponding to a desired PAPR of the combined multi-channel signal. In most cases, it would be desired to reduce the PAPR to a minimum, but this is not a limitation of the technique, and the selected time-shift may be based on other criteria.

It is noted that each of the OFDM signals may be preprocessed in accordance with known schemes, and thus each may have been themselves processed to reduce an intrinsic PAPR, though preferably any preprocessing of the signals is coordinated with the processing of the combined signals to achieve an optimum cost and benefit. For example, where two separate signals are to be combined, each having a high PAPR, a resulting signal of reduced PAPR can be achieved if the peaks add out of phase, and thus cancel. Therefore, initial uncoordinated efforts to modify the input OFDM signals may have limited benefit.

It is noted that the present system seeks to combine independently formatted OFDM, which are generally targeted to different receivers or sets of receivers, and these sets are typically not coordinated with each other. For example, in a cellular transceiver system, a base station may serve hundreds or thousands of cell phones, each phone monitoring a single OFDM broadcast channel, with the base station servicing multiple OFDM channels. It is particularly noted that each set of OFDM subcarriers is orthogonal, but the separate OFDM signals, and their subcarriers, are generally not orthogonal with each other. The OFDM signals may be in channels which are adjacent or displaced, and therefore a relative phase change between OFDM signals can occur during a single symbol period. Therefore, the PAPR must be considered over the entire symbol period.

Indeed, according to another embodiment of the method, it is not the PAPR of the signal which is analyzed for optimization, but rather an inferred error at the receiver. This, if the PAPR of the composite signal is high for only a small portion of a symbol period, such that the PA distorts or clips the signal at that time, but at most other times the combined signals are well within specification, the result may be an acceptable transmission which would likely result in a low error probability. Indeed, in some cases, the error probability may be lower than for signals with a lower absolute peak. Therefore, by employing a model of a receiver, which itself may include margins for specific communication channel impairments to specific receivers, and Doppler shifts (which may be determined, for example by analyzing return path characteristics), or over a range of possible variation, as part of the transmitter signal processing path, better performance may be available than by simply minimizing the PAPR.

Another option is to modify the OFDM signal during all or a portion of the period in a manner which deviates from a standard protocol, which is, for example an IEEE-802 OFDM standard, WiFi, WiMax, DAB, DVB, cellular communication, LTE signal, or the like, but which does not substantively increase a predicted BER of a standard or specific receiver. For example, if the PAPR is high for a small portion a symbol period, such that if during a portion of the symbol period, one or more subcarriers were eliminated or modified, the PAPR would be acceptable, and the signal at the receiver would have sufficient information to be decoded using a standard receiver without significant increase in BER, then the transmitter could implement such modifications without need to transmit side information identifying the modifications which necessary for demodulation. Another possible deviation is, for example, to frequency shift the signal (which mildly violates the orthogonality criterion), within the tolerance of a receiver to operate within a range of Doppler shifts which are equivalent to frequency shifts.

Consider two OFDM signals that are being combined as in FIG. 2. For simplicity, call Signal 1 (S1) the reference signal, and Signal 2 (S2) the modified signal. During each OFDM symbol period, the baseband digital data bits for each signal will be stored in memory. Assume that the Preamble has been stripped off, but the Cyclic Prefix CP remains. As indicated in FIG. 3 for one embodiment of the invention, the bits for the reference signal S1 are stored in a first-in-first-out (FIFO) shift register (SR). The corresponding bits for the modified signal S2 are stored in a circular shift register (CSR), so configured that the data contained can be rotated under program control. The data for both signals are first up-converted to an intermediate frequency (IF) and then combined (added), while maintaining digital format at a sampling frequency increased over the digital data rate. The combined IF signals are then subjected to a PAPR test, to determine whether the peak power level is acceptable, or, in other embodiments, whether other criteria are met. This might correspond, for example, to a PAPR of 9 dB. If the test is passed, then the data bits for the combined OFDM symbols are read out, to be subsequently reassembled into the full OFDM frame and up-converted to the full RF, for further amplification in the PA and transmission. According to another embodiment, a combined OFDM representation of the combined data is itself the source for the up-conversion.

More generally, once the parametric transformation (relative time-shift) to achieve the desired criteria is determined, the final signal is then formulated dependent on that parameter or a resulting representation, which may be the digital data bits of the baseband signal or a converted form thereof; in the latter case, the system may implement a series of transformations on the data, some of which are redundant or failed, seeking an acceptable one or optimum one; once that is found, it may not be necessary to repeat the series or transformations again. Likewise, the option of reverting to the original digital data and repeating the determined series of transformations allows a somewhat different representation to be formed in the register, for example one which is simplified or predistorted to allow consideration of analog component performance issues in the combining test.

Even more generally, the technique provides that each signal to be combined is provided with a range of one or more acceptable parameters, which may vary incrementally, algorithmically, randomly, or otherwise, and at least a portion of the possible combinations tested and/or analyzed for conformity with one or more criteria, and thereafter the combination of OFDM signals implemented using the selected parameter(s) from a larger set of available parameters. This parametric variation and testing may be performed with high speed digital circuits, such as superconducting logic, in a serial fashion, or slower logic with parallelization as necessary, though other technologies may be employed as appropriate and/or necessary, including but not limited to optical computers, programmable logic arrays, massively parallel computers (e.g., graphic processors, such as nVidia Tesla® GPU, ATI Radeon R66, R700), and the like. The use of superconducting digital circuits may be advantageous, for example, where a large number of complex computations which make significant use of a specialized high speed processor, such as where a large number of independent receivers are modeled as part of a transmitter optimization.

In the preferred embodiment, at any state of the tests over the parametric range, if the test is not passed, a control signal is fed back to the register, e.g., CSR, which rotates the data bits of the modified signal S2. The shifted data is then combined with the initial stored data from S1 as before, and the PAPR re-tested. This is repeated until the PAPR test is passed. A similar sequence of steps is illustrated in FIG. 4, where stripping off the preamble and reattaching it at the end are explicitly shown. It is noted that, in some cases, the tests may be applied in parallel, and therefore a strictly iterative test is not required. This, in turn, permits use of lower speed testing logic, albeit of higher complexity. Likewise, at each relative time-shift, a secondary parameter may also be considered.

For example, a secondary consideration for optimal combining may be in-band (non-filterable) intermodulation distortion. Thus, at each basic parametric variation, the predicted in-band intermodulation distortion, expressed, for example, as a power and/or inferred BER, may be calculated. This consideration may be merged with the PAPR, for example, by imposing a threshold or optimizing a simple linear combination "cost function", within an acceptable PAPR range.

While there may be some delays in this Shift-and-Add process (SAA), the time for the entire decision algorithm, including all iterations, must not exceed the expanded symbol time $T+\Delta T$. We have described a serial decision process in FIGS. 3 and 4. As discussed, above, in some cases, it may be preferable to carry out parts of this process in parallel, using multiple CSRs with different shifts and multiple parallel PAPR tests, in order to complete the process more quickly. This is illustrated in FIG. 5, which suggests parallel memories (shown here as RAMs), each with an appropriate time shift, where the minimum PAPR is selected to send to the RF subsystem. The optimum tradeoff between circuit speed and complexity will determine the preferred configuration.

In some situations, the search for an optimum combined signal requires vast computational resources. In fact, heuristics may be available to limit the search while still achieving an acceptable result. In the case of a PAPR optimization, generally the goal is to test for limited, low probability "worst case" combinations of symbols. If the raw digital data is available, a lookup table may be employed to test for bad combinations, which can then be addressed according to a predetermined modification. However, for multi-way combinations of complex symbols this lookup table may be infeasible. On the other hand, the individual OFDM waveforms may each be searched for peaks, for example 6 dB above mean, and only these portions of the signal analyzed to determine whether there is a temporal alignment with the peaks of other OFDM signals; if the peaks are not temporally synchronized, then a presumption is made that an unacceptable peak will not result in the final combined signal. This method makes a presumption that should be statistically acceptable, that is, that only portions of an OFDM waveform that are themselves relative peaks will contribute to large peaks in the combination of OFDM signals. This method avoids serial testing of sequential parametric variations, and rather simply avoids worst case superpositions of a binary threshold condition.

It is important to note that the circularly shifted symbol data for the modified signal represents exactly the same set of symbols as the unshifted data. Further, because of the standard properties of OFDM signals, the shifted symbol set can be transmitted and received with no special side-information, and with no degradation of signal integrity. So the combined OFDM channels with reduced PAPR should exhibit essentially the same performance as the original unshifted version. A set of detailed simulations that confirm this are described in the Detailed Description section below.

Although these figures focus on the case of reducing PAPR for the combination of two OFDM channels, this method is not limited to two channels. Three or more channels can be optimized by a similar method of circular time shifts, followed by PAPR tests.

DETAILED DESCRIPTION OF THE PREFERRED EMBODIMENTS

Figure 1A:
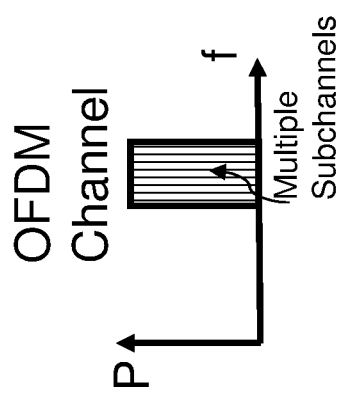
FIGS. 1A and 1B shows typical behavior of an orthogonal frequency-domain multiplexed channel in the frequency and time domains.
Figure 1B:
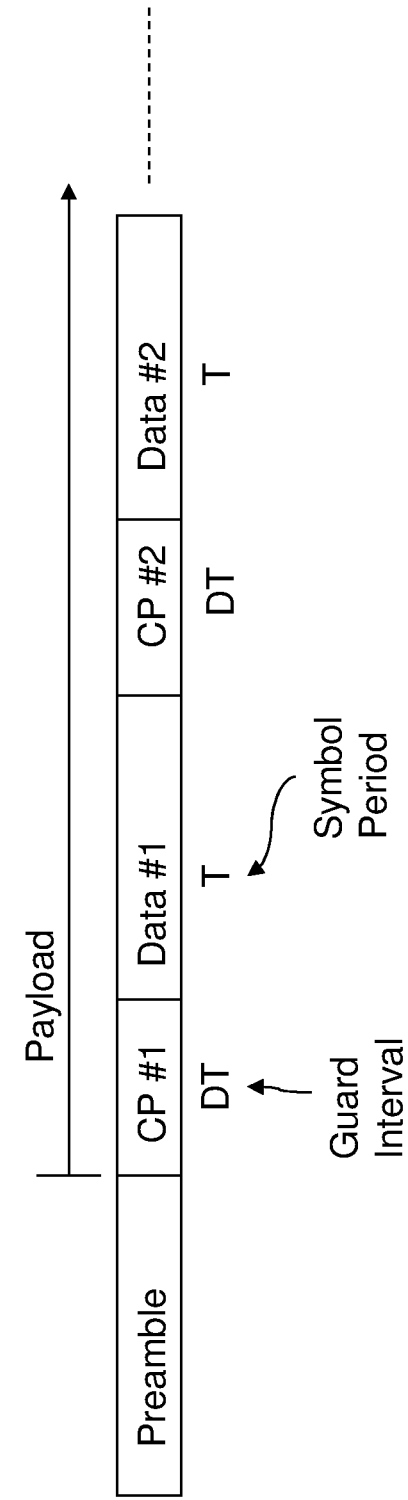
Figure 2:
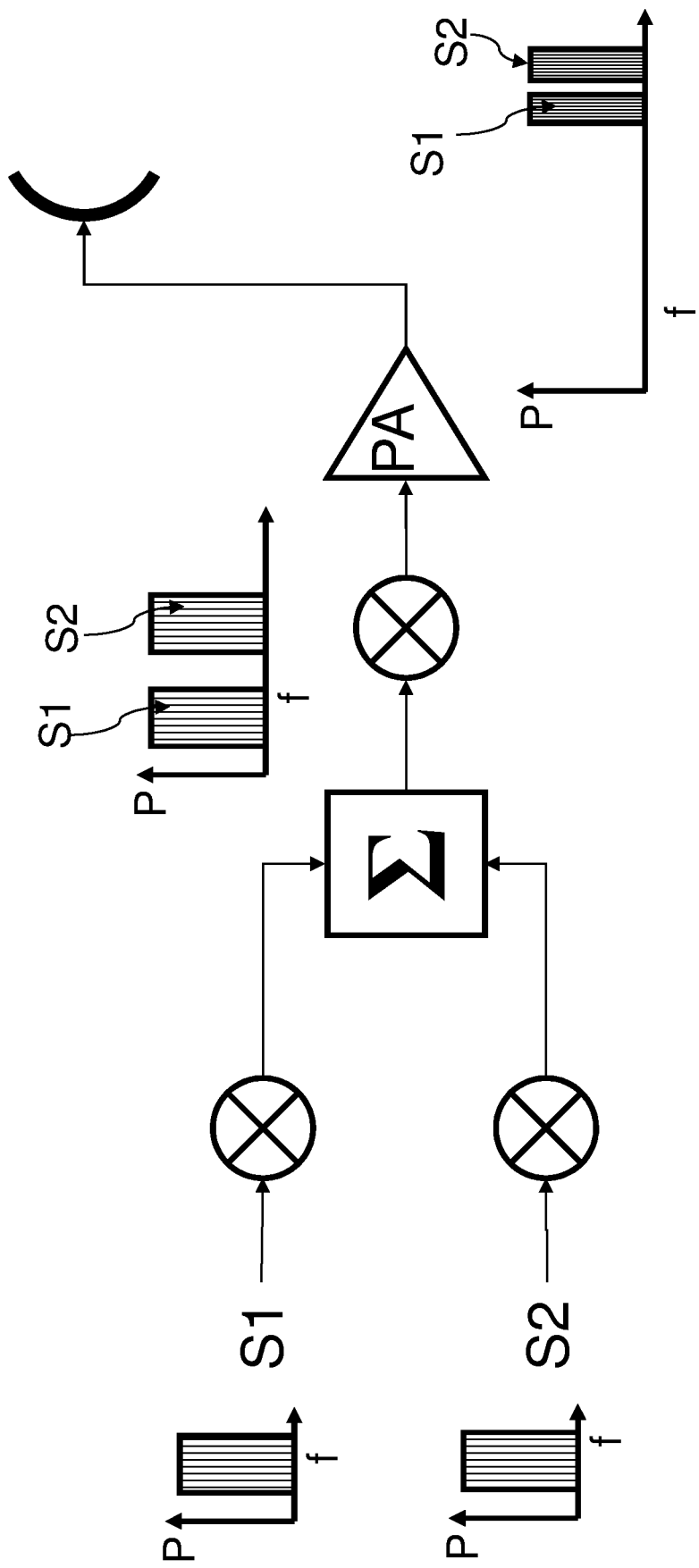
FIG. 2 shows the combination of two OFDM channels in a transmitter using a double-upconversion method.

OFDM channels are comprised of many sub-channels, each of which is a narrow-band signal (FIGS. 1A and 1B). An OFDM channel itself has a time-varying envelope, and may exhibit a substantial PAPR, typically 9-10 dB. However, if two separate similar OFDM channels are combined, the resulting signal will exhibit PAPR of 12-13 dB, for a gain of 3 dB. This is unacceptably large, since it would require a power amplifier with 4 times the capacity to transmit a combined signal that averages only 2 times larger.

A preferred embodiment therefore provides a PAPR reduction method which reduces the PAPR of a two OFDM channel combined signal from 12-13 dB back down to the 9-10 dB of the original components. This ~3 dB reduction in PAPR is preferably accomplished without degradation of the signal, and without the need to transmit any special side information that the receiver would need to recover the OFDM symbols. Further, the algorithm is simple enough that it can be implemented in any hardware technology, as long as it is sufficiently fast.

Conventional methods of PAPR reduction focus on combining the sub-channels and generating a single OFDM channel without excessive PAPR. The present technique can be viewed in certain respects as a combination of Partial Transmit Sequence (PTM) and Selected Mapping (SLM).

In traditional PTS, an input data block of N symbols is partitioned into disjoint sub-blocks. The sub-carriers in each sub-block are weighted by a phase factor for that sub-block. The phase factors are selected such that the PAPR of the combined signal is minimized.

In the SLM technique, the transmitter generates a set of sufficiently different candidate data blocks, all representing the same information as the original data block, and selects the most favorable for transmission (lowest PAPR without signal degradation).

The present hybrid approach combines elements of PTS and SLM for summed carrier modulated signals. The various cyclic time-shifts of the oversampled OFDM waveform are searched, and the time-shift with the lowest PAPR selected. One OFDM signal is used as reference and the other carrier modulated signal(s) are used to generate the time-shifts, in a manner similar to PTS. The search window is determined by the cyclic prefix length and the oversampling rate.

While the phase space of possible combinations of shifts increases tremendously, it would not be necessary to explore all such combinations. In general, very high values of the PAPR occur relatively rarely, so that most time shifts starting with a high-PAPR state would tend to result in a reduction in PAPR. Shifts in multiple channels could be implemented sequentially or in parallel, or in some combination of the two. Thus, for example, any combination with a PAPR within an acceptable range is acceptable, any unacceptable PAPR states occur 1% of the time, the search space to find an acceptable PAPR would generally be <2% of the possible states. On the other hand, if other acceptability criteria are employed, a larger search space may be necessary or appropriate. For example, assuming that there is a higher cost for transmitting a higher PAPR signal, e.g., a power cost or an interference cost, then a formal optimization may be appropriate. Assuming that no heuristic is available for predicting an optimal state, a full search of the parametric space may then be appropriate to minimize the cost.

This differs from conventional approaches, wherein different OFDM channels are independent of one another, with separate transmit chains and without mutual synchronization. Further, the conventional approaches operate directly on the baseband signals. In contrast, the present method evaluates PAPR on an up-converted, combined signal that incorporates two or more OFDM channels, and the symbol periods for each of these channels must be synchronized. This will not cause problems at the receivers, where each channel is received and clocked independently.

Some conventional approaches to PAPR are based on clipping, but these inevitably produce distortion and out-of-band generation. Some other approaches avoid distortion, but require special transformations that must be decoded at the receive end. These either require sending side-information, or involve deviations from the standard OFDM communication protocols. The present preferred approach has neither shortcoming.

OFDM channels used in cellular communications, may be up to 10 or 20 MHz in bandwidth. However, these channels might be located in a much broader frequency band, such as 2.5-2.7 GHz. So one might have a combination of two or more OFDM channels, each 10 MHz wide, separated by 100 MHz or more. A 10 MHz digital baseband signal may be sampled at a rate as low as 20 MS/s, but a combined digital signal covering 100 MHz must be sampled at a rate of at least 200 MS/s.

Figure 3:
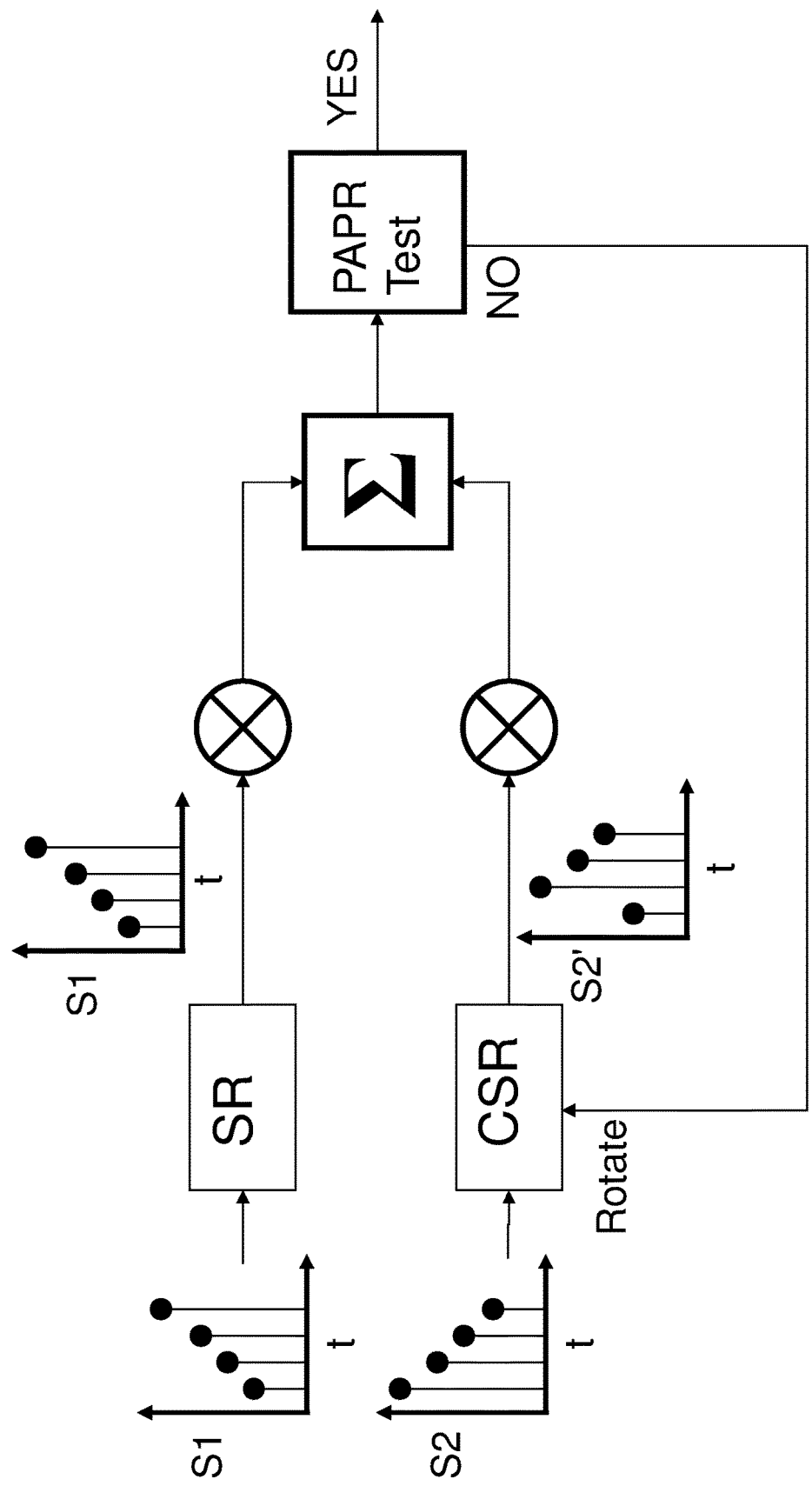
FIG. 3 provides a simple block diagram showing how two OFDM channels may be combined, wherein the data bits of one OFDM channel may be cyclically shifted in order to reduce the peak-to-average power ratio (PAPR).
Figure 4:
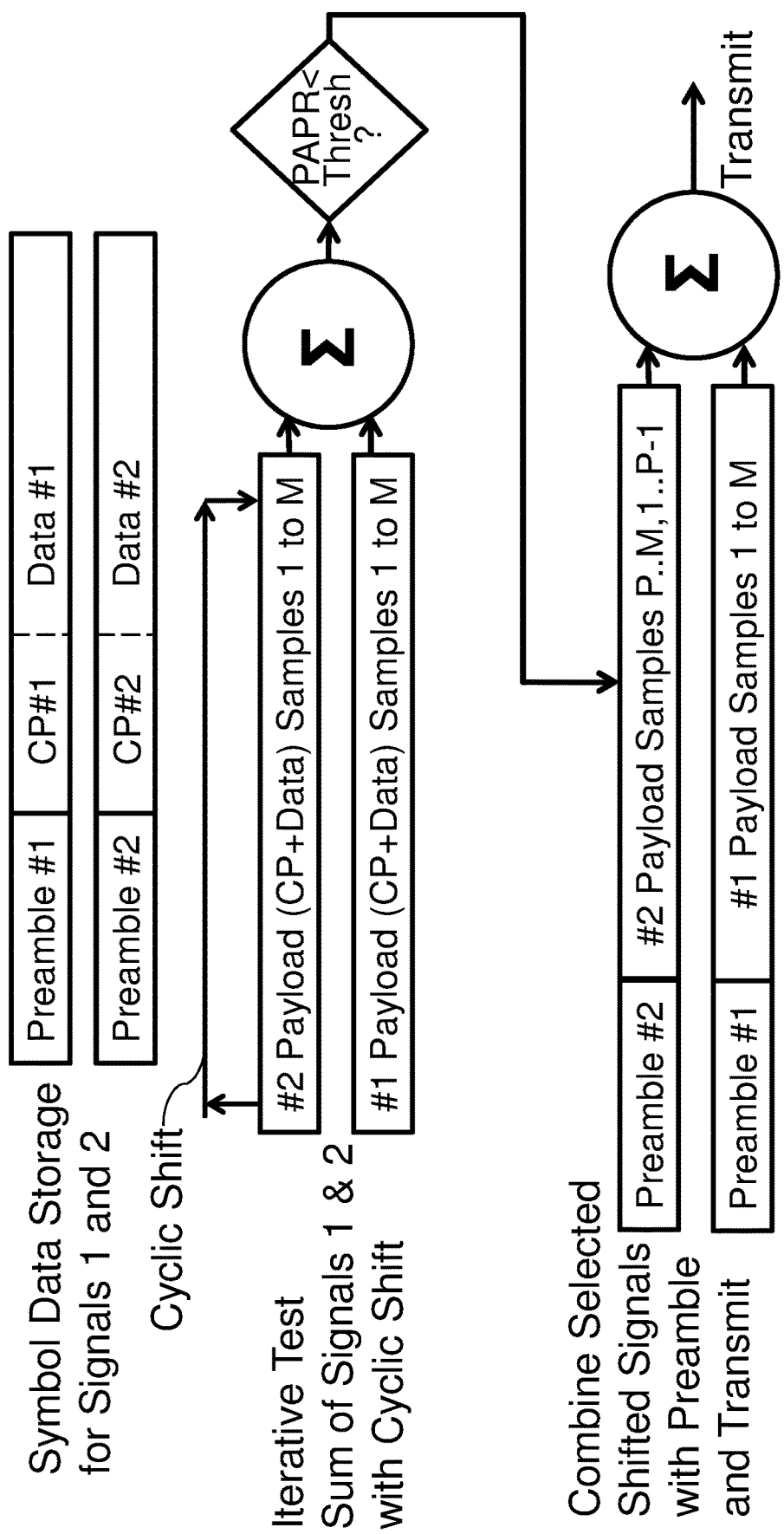
FIG. 4 shows the structure of two OFDM channels, with cyclic shifting of the data for one channel in order to reduce the PAPR.
Figure 5:
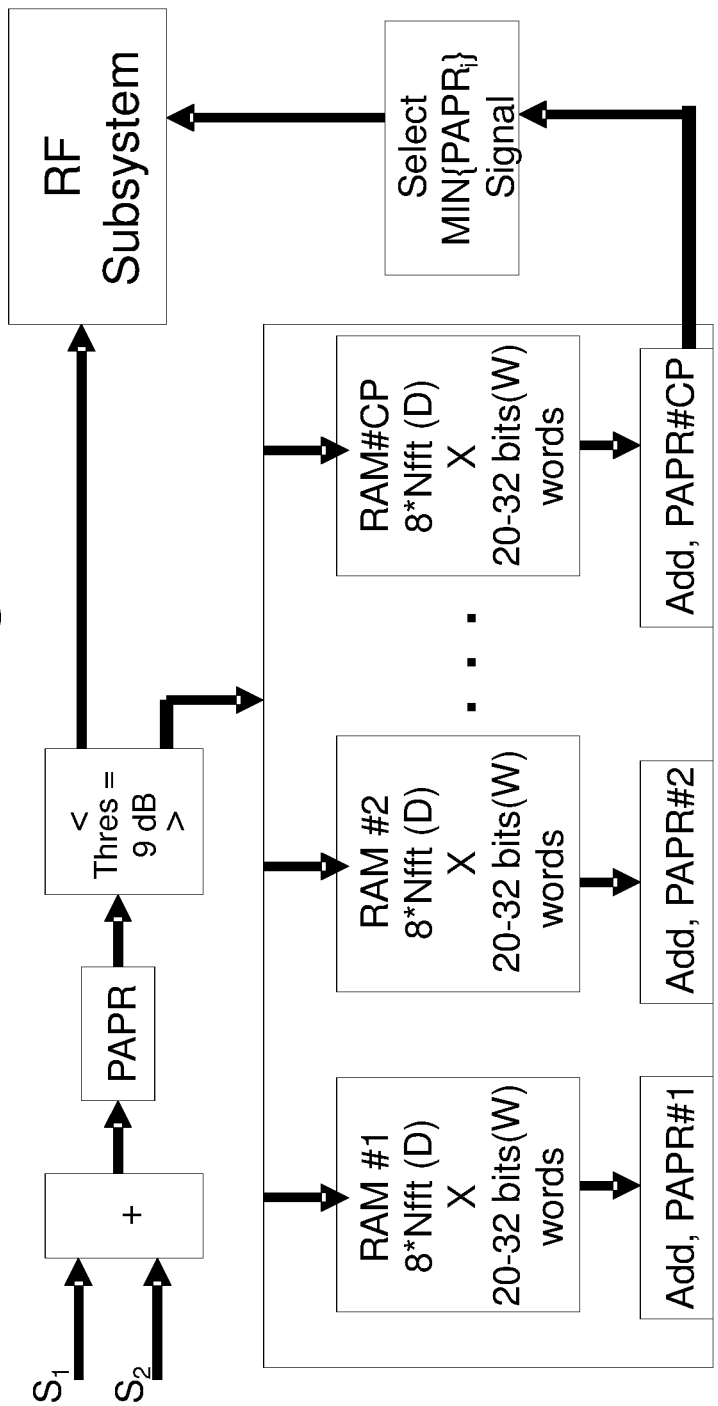
FIG. 5 provides a block diagram showing memory storage of multiple shifted replicas of data from an OFDM channel, with selection of one replica corresponding to minimizing the PAPR.

In a preferred embodiment, the signal combination (including the up-conversion in FIG. 3) is carried out in the digital domain at such an enhanced sampling rate. The PAPR threshold test and CSR control are also implemented at the higher rate. This rate should be fast enough so that multiple iterations can be carried out within a single symbol time (several microseconds).

Figure 6:
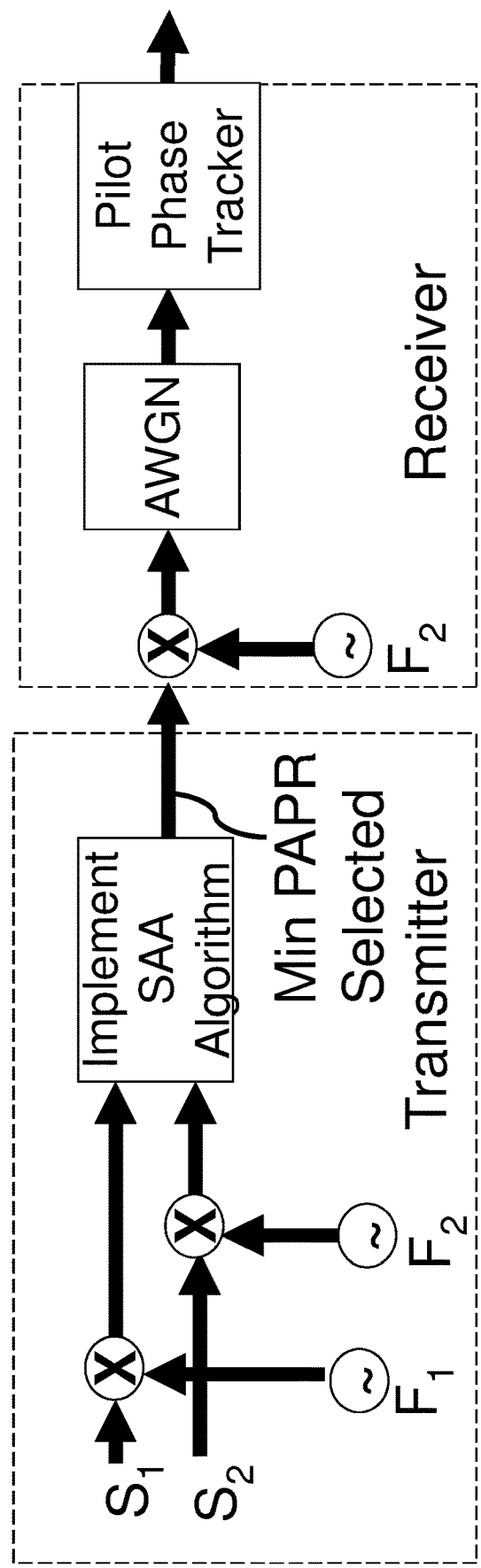
FIG. 6 shows a block diagram of a simulated communication system that incorporates the shift-and-add algorithm in the transmitter.
Figure 7:
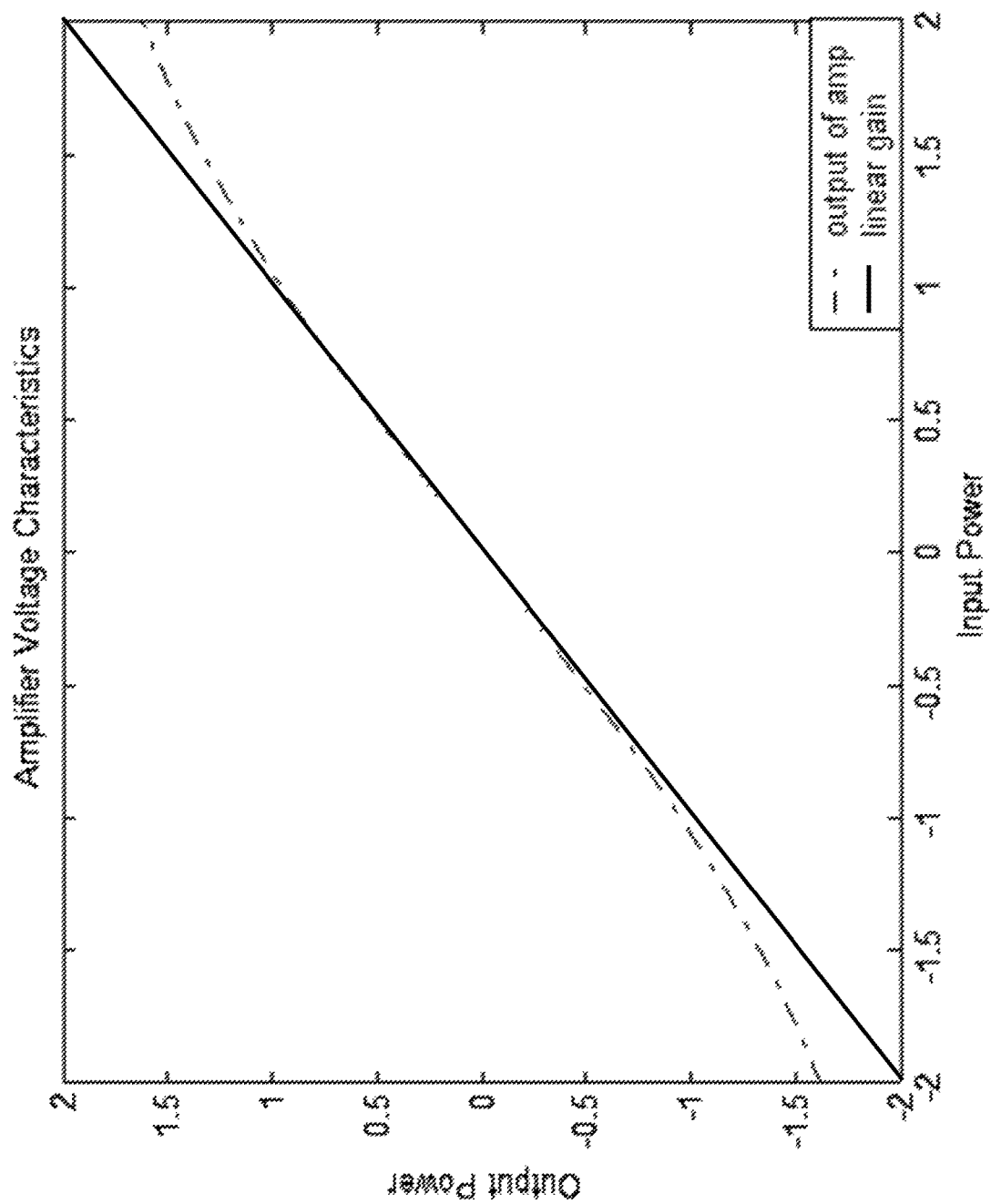
FIG. 7 shows the transfer function of the Power Amplifier included in the transmitter for the simulation shown in FIG. 6.

In order to verify the expectation that the circular time-shift permits reduction in PAPR for combined OFDM channels, without degrading system performance, a full Monte-Carlo simulation of OFDM transmission and reception was carried out. The block diagram of this simulation is summarized in FIG. 6, which represents the "SAA Evaluation Test Bench", and shows a transmitter that combines OFDM signals $S_1$ and $S_2$ at frequencies $F_1$ and $F_2$, subject to the SAA algorithm for PAPR reduction. At the receive end, this is down-converted and the signal at $F_2$ is recovered using a standard OFDM receiver. Along the way, appropriate Additive White Gaussian Noise (AWGN) is added to the channel. The simulation also includes a realistic transfer function for an almost-linear Power Amplifier (PA), showing deviation from linearity near saturation (see FIG. 7). The gain factor does not matter for this simulation, so this was not included.

In these simulations, the PAPR of the OFDM signals at F1 and F2 are typically 9-10 dB, and these are then added together to yield a combined signal with a typical PAPR of 12-13 dB. To minimize nonlinear distortion in the transmitted signal, the input power backoff (in dB) for the operation of the transmitter PA is selected to be equal to the PAPR for the combined signal. For each selected value of AWGN, the SNR (in dB) is calculated based on the average powers of the noise and the signal. Then the simulation is run and the bit-error-rate (BER) obtained from the digital signal reconstruction in the OFDM receiver. After application of the SAA, the PAPR is reduced, typically by up to 3 dB, to obtain a modified combined signal with PAPR of 9-10 dB. The input power backoff is then reduced to the new value of the PAPR, and the BER vs. SNR values resimulated.

The parameters for the PAPR bit-error-rate (BER) simulations include the following. Each packet contains 800 bytes of information, which is modulated over several OFDM symbol periods, depending on the modulation type used. Both QPSK (quadrature phase-shift keying) and 16-QAM (16-quadrature amplitude modulation) are examined. Each SNR point is run until 250 packet errors occur. The cyclic prefix is set to ⅛ of the total symbol time. Carriers at frequencies $F_1$ and $F_2$ are spaced sufficiently that their spectra do not overlap. The oversampling rate is a factor of 8. Finally, a raised cosine filter was used, with a very sharp rolloff, with a sampling frequency $F_s$=160 MHz, and a frequency cutoff $F_c$=24 MHz. A PAPR threshold of about 9 dB for the combined OFDM channels was used.

Figure 8:
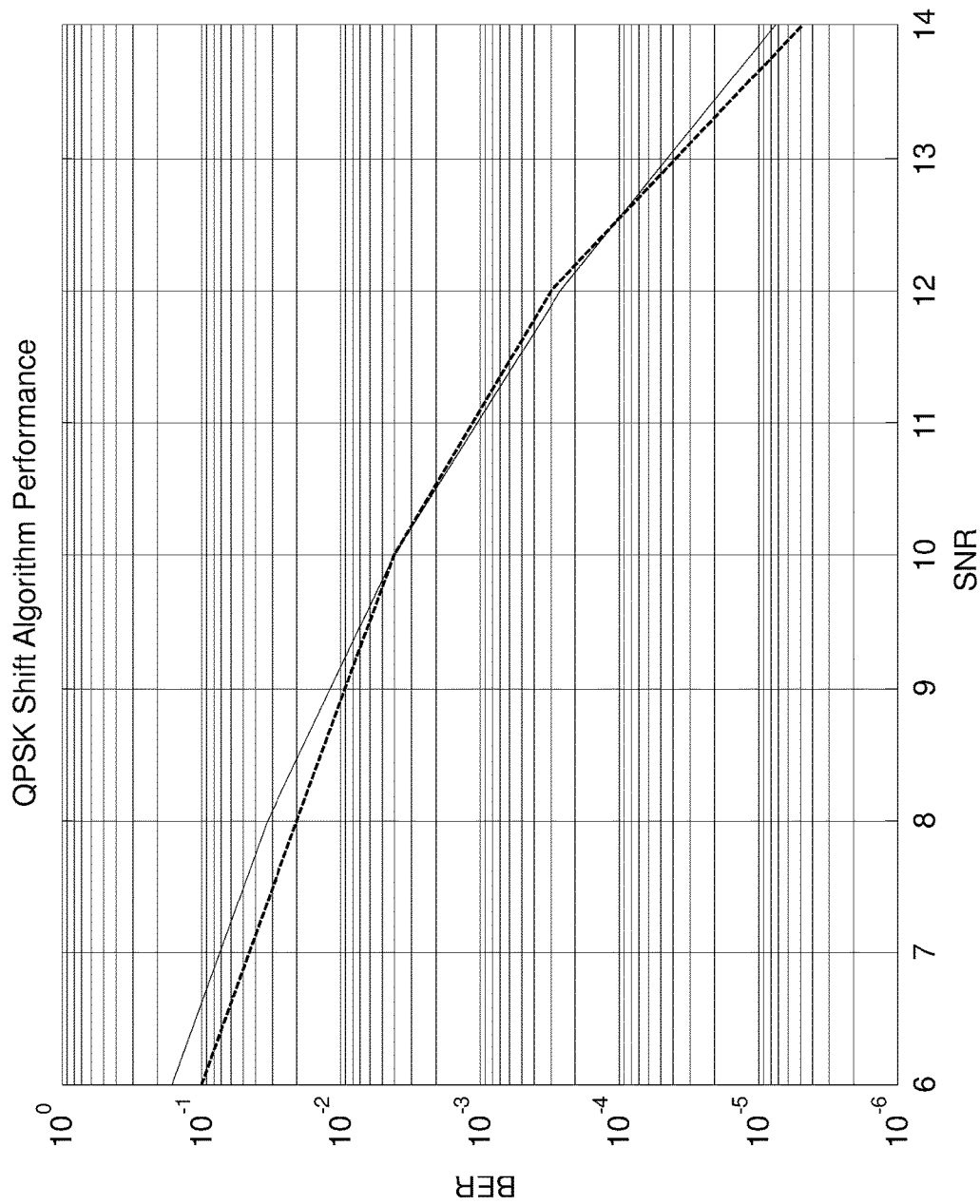
FIG. 8 plots the bit-error rate (BER) for the simulation using quadrature phase-shift keyed (QPSK) OFDM signals, as a function of the signal-to-noise ratio (SNR), with and without the Shift-and-Add algorithm.
Figure 9:
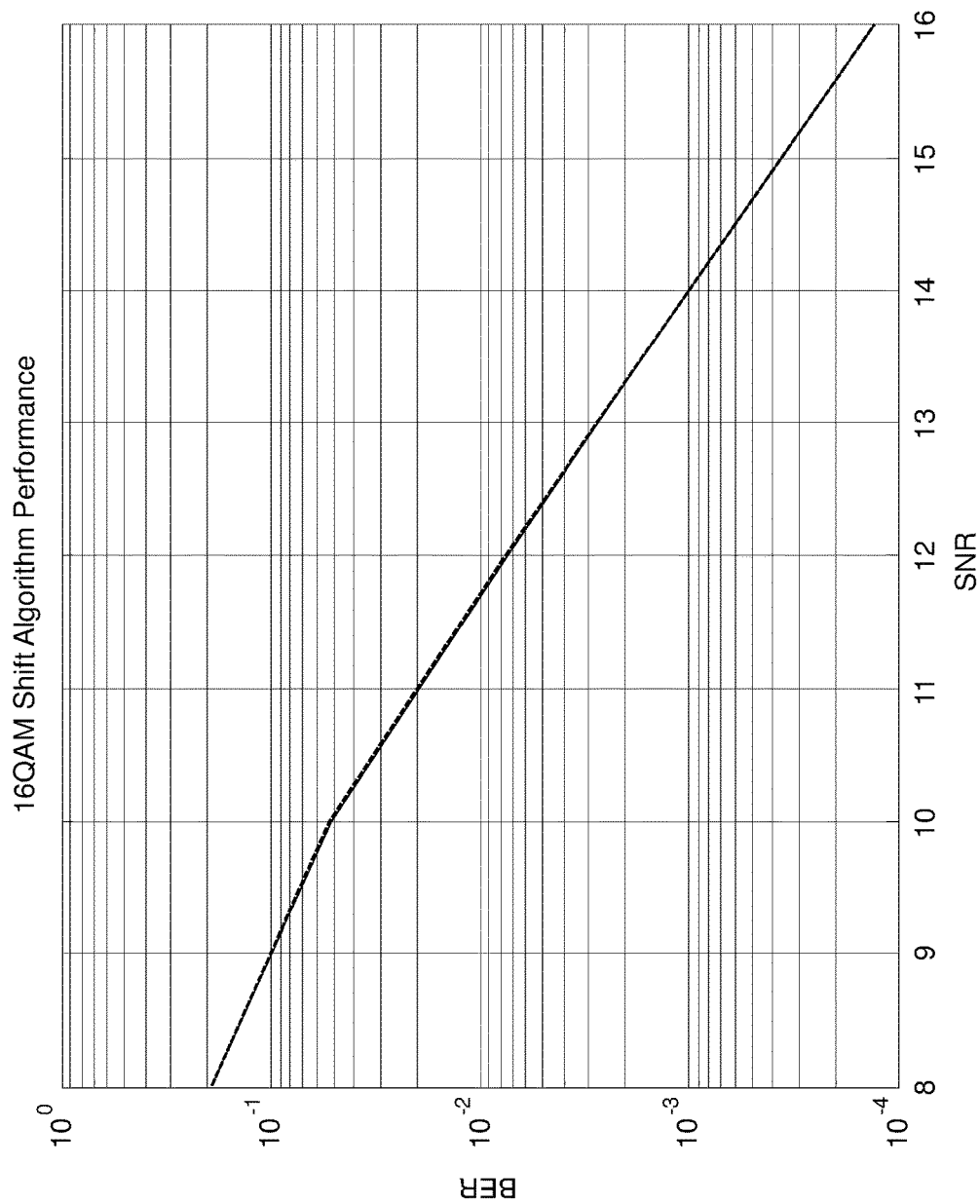
FIG. 9 plots BER using 16-quadrature-amplitude modulated signals (16-QAM) as a function of SNR, with and without the Shift-and-Add algorithm.

FIG. 8 shows the BER performance, as a function signal-to-noise ratio (SNR) (i.e., varying the AWGN power), with and without application of the SAA algorithm, for QPSK modulation. FIG. 9 shows the corresponding analysis for 16-QAM. In both cases, there is very little degradation in BER from zero-shift curves. In FIGS. 8 and 9, the dashed line represents the BER vs. SNR for the combined signal without modification, while the solid line represents the BER vs. SNR for the combined signal after PAPR reduction using SAA. In FIG. 9 for 16QAM, the two lines are virtually indistinguishable. Thus, we have confirmed in these cases that the reduction in PAPR produced by SAA is not accompanied by an increase in signal distortion, and therefore that the SAA improves the system transmission efficiency by the full amount of the PAPR reduction, with no significant degradation in system performance. We further expect similar results (reduction in combined PAPR without signal degradation) to hold for combinations of three or more OFDM signals.

Analyzed quantitatively, the net performance improvement using the SAA is 2.35 dB for QPSK and 2.9 dB for 16-QAM, as inferred from the BER plots. For example, if without SAA, the BER exhibits an error floor of 0.03 at an input backoff (for the PA) of 8.5 dB, whereas the BER exhibits the same error floor with SAA of 6.5 dB, the performance improvement will be 8.5-6.5=2 dB.

These simulations have confirmed not only that the SAA algorithm permits reduction of PAPR in combined OFDM channels by ~3 dB, but also that this reduction is achieved without signal degradation and without the need to send any special side information on the transformations in the transmit signal.

One preferred implementation of the technique involves using a fast field-programmable gate array (FPGA) with blocks for shift-register memories, digital up-conversion, and threshold testing. Alternatively, an ultrafast digital technology, such as rapid-single-flux-quantum (RSFQ) superconducting circuits, may be employed. As the number of OFDM channels being combined is increased, one needs either to increase the algorithm speed, or alternatively carry out a portion of the processing in parallel.

This method may also be applied to a reconfigurable system along the lines of cognitive radio, wherein the channels to be transmitted may be dynamically reassigned depending on user demand and available bandwidth. Both the number of transmitted channels and their frequency allocation may be varied, under full software control. As long as all channels follow the same general symbol protocol and timing, one may apply a similar set of Shift-and-Add algorithms to maintain an acceptable PAPR for efficient transmission.

What is claimed is:

1. A radio transmitter, comprising:
    at least one input port configured to receive a first radio frequency modulated signal, comprising a first set of orthogonal frequency division multiplexed subcarriers and a second radio frequency modulated signal, comprising a second set of orthogonal frequency division multiplexed subcarriers, the first set of orthogonal frequency division multiplexed subcarriers occupying different frequencies than the second set of orthogonal frequency division multiplexed subcarriers;
    at least one processor configured to determine a peak power of a radio frequency modulated combination of the first radio frequency modulated signal and each of a set of time shifted representations of the second radio frequency modulated signal, and to select a respective radio frequency modulated combination based on the respective peak power and at least one suitability criterion;
    a power amplifier configured to concurrently amplify the selected respective radio frequency modulated combination; and
    at least one output configured to communicate the radio frequency modulated combination of the first radio frequency modulated signal and the second radio frequency modulated signal to at least one antenna.

2. The radio transmitter according to claim 1, wherein the first radio frequency modulated signal and the second radio frequency modulated signal are each an orthogonal frequency division multiplexed radio frequency modulated signal within a distinct non-overlapping band.

3. The radio transmitter according to claim 1, wherein the first radio frequency modulated signal and the second radio frequency modulated signal are each an orthogonal frequency division multiplexed radio frequency modulated signal which is compatible with at least one protocol selected from the group of an IEEE 802.11 protocol, an IEEE 802.16 protocol, a 3GPP-LTE downlink protocol, a DAB protocol and a DVB protocol.

4. The radio transmitter according to claim 1, wherein the first radio frequency modulated signal and the second radio frequency modulated signal each have a radio frequency bandwidth of at least 10 MHz.

5. The radio transmitter according to claim 1, wherein the first radio frequency modulated signal and the second radio frequency modulated signal are each an orthogonal frequency division multiplexed radio frequency modulated signal which are not mutually orthogonal.

6. The radio transmitter according to claim 1, wherein the first radio frequency modulated signal and the second radio frequency modulated signal each communicate a succession of information symbols within successive symbol periods, and the determination of the peak power of the radio frequency modulated combination of the first radio frequency modulated signal and each of the set of time shifted representations of the second radio frequency modulated signal occurs for each respective symbol period, and wherein the at least one processor is further configured to select the respective radio frequency modulated combination based on the respective peak power and the at least one suitability criterion during each the successive symbol periods.

7. The radio transmitter according to claim 1, wherein each of the first radio frequency modulated signal and the second radio frequency modulated signal each have a radio frequency bandwidth of at least 10 MHz.

8. The radio transmitter according to claim 1, wherein the at least one suitability criterion is at least one of: a lowest peak value, a lowest peak to average ratio, a peak value below a threshold, and a lowest peak to average ratio below a threshold.

9. A method of transmitting a radio signal, comprising:
receiving first radio frequency modulated signal, comprising a first set of orthogonal frequency division multiplexed subcarriers;
receiving second radio frequency modulated signal, comprising a second set of orthogonal frequency division multiplexed subcarriers;
the first set of orthogonal frequency division multiplexed subcarriers occupying different frequencies than the second set of orthogonal frequency division multiplexed subcarriers;
determining a peak power of a radio frequency modulated combination of the first radio frequency modulated signal and each of a set of time shifted representations of the second radio frequency modulated signal;
selecting a respective radio frequency modulated combination based on the respective peak power and at least one suitability criterion;
concurrently amplifying the selected respective radio frequency modulated combination with a common power amplifier; and
communicating the radio frequency modulated combination of the first radio frequency modulated signal and the second radio frequency modulated signal to at least one antenna.

10. The method according to claim 9, wherein the first radio frequency modulated signal and the second radio frequency modulated signal are each an orthogonal frequency division multiplexed radio frequency modulated signal in a distinct and non-overlapping channel.

11. The method according to claim 9, wherein the first radio frequency modulated signal and the second radio frequency modulated signal each have a radio frequency bandwidth of at least 10 MHz.

12. The method according to claim 9, wherein the first radio frequency modulated signal and the second radio frequency modulated signal are each an orthogonal frequency division multiplexed radio frequency modulated signal which are not mutually orthogonal.

13. The method according to claim 9, wherein the first radio frequency modulated signal and the second radio frequency modulated signal each communicate a succession of information symbols over successive symbol periods, said determining of the peak power of the radio frequency modulated combination of the first radio frequency modulated signal and each of the set of time shifted representations of the second radio frequency modulated signal occurs for each respective symbol period, and the selecting of the respective radio frequency modulated combination based on the respective peak power and the at least one suitability criterion occur during each of the successive symbol periods.

14. The method according to claim 9, wherein the at least one suitability criterion is at least one of: a lowest peak value, a lowest peak to average ratio, a peak value below a threshold, and a lowest peak to average ratio below a threshold.

15. A radio transmitter, comprising:
an input configured to receive a plurality of radio frequency modulated signals, each respective radio frequency modulated signal comprising a set of orthogonal frequency division multiplexed subcarriers, the plurality of radio frequency modulated signals each occupying different frequencies;
at least one processor configured to:
determine a plurality of combination metrics for the plurality of radio frequency modulated signals over a respective range of time shifted representations of a respective radio frequency modulated signal, and
select a respective combination of the plurality of radio frequency modulated signals comprising at least two radio frequency modulated signals, wherein at least one of the radio frequency modulated signals is time shifted with respect to another of the radio frequency modulated signals within the respective range, based on analysis of the combination metrics;
at least one output configured to communicate the selected respective combination; and
a power amplifier, configured to amplify the selected respective combination.

16. The radio transmitter according to claim 15, further comprising a power amplifier configured to amplify the selected respective combination of the plurality of radio frequency modulated signals, each of the respective plurality of radio frequency modulated signals being an orthogonal frequency division multiplexed radio frequency signal in a different radio frequency communication band.

17. The radio transmitter according to claim 15, wherein the at least one of the plurality of radio frequency modulated signals is an orthogonal frequency division multiplexed radio frequency modulated signal which is compatible with at least one protocol selected from the group of an IEEE 802.11 protocol, an IEEE 802.16 protocol, a 3GPP-LTE downlink protocol, a DAB protocol and a DVB protocol.

18. The radio transmitter according to claim 15, wherein the plurality of radio frequency modulated signals each have a radio frequency bandwidth of at least 10 MHz.

19. The radio transmitter according to claim 15, wherein the plurality of radio frequency modulated signals are each an orthogonal frequency division multiplexed radio frequency modulated signal which are not mutually orthogonal.

20. The radio transmitter according to claim 15, wherein the plurality of radio frequency modulated signals have successive symbol periods, the combination metrics are based on a respective peak power during each of the successive symbol periods, and the determination of the combination metrics occur for each respective symbol period.

\* \* \* \* \*